May 17, 1932.  C. PEARSON  1,859,156
SWEEP RAKE
Filed Oct. 20, 1930  2 Sheets-Sheet 2
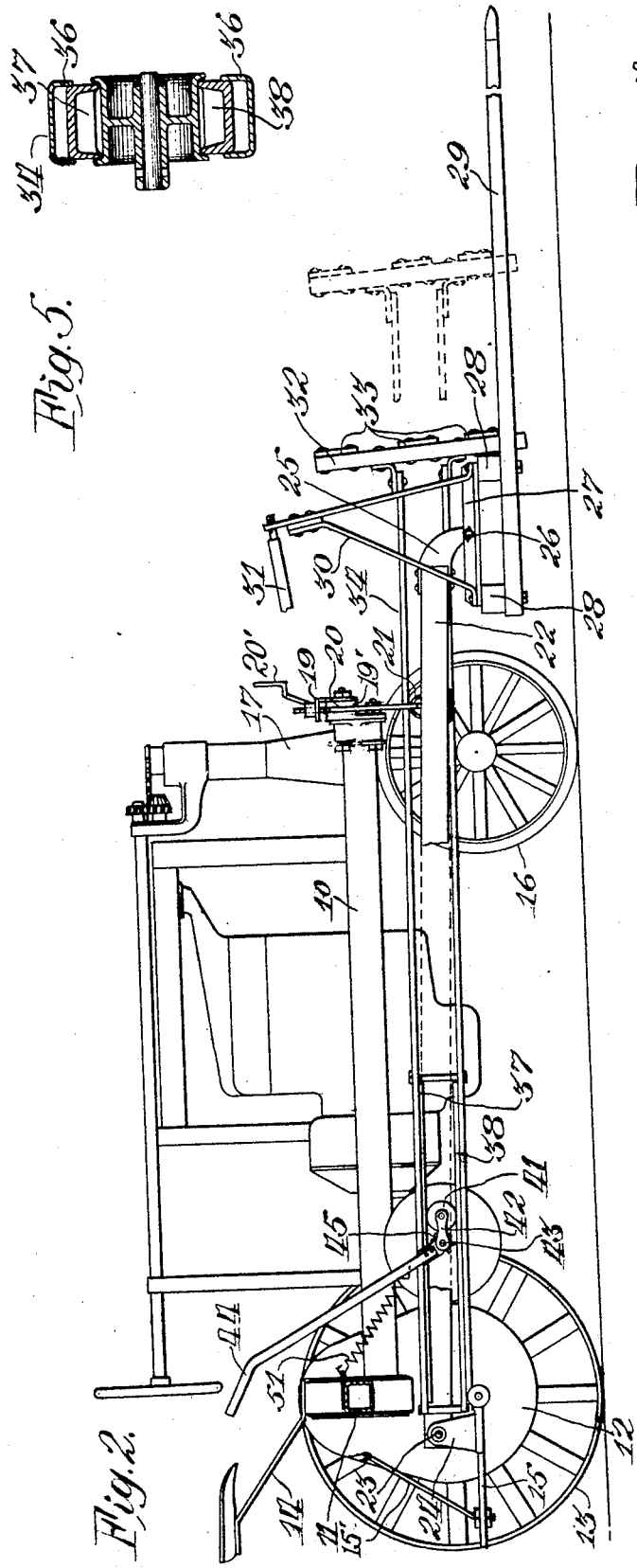
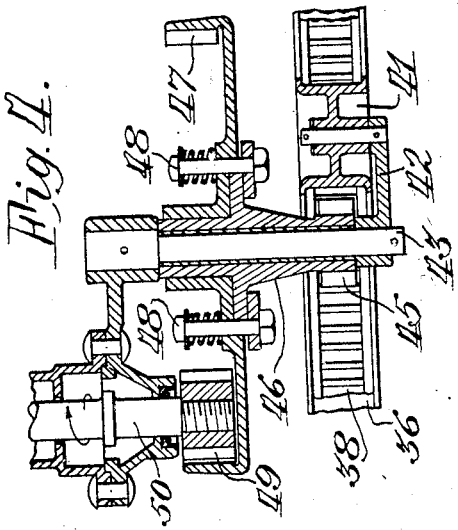
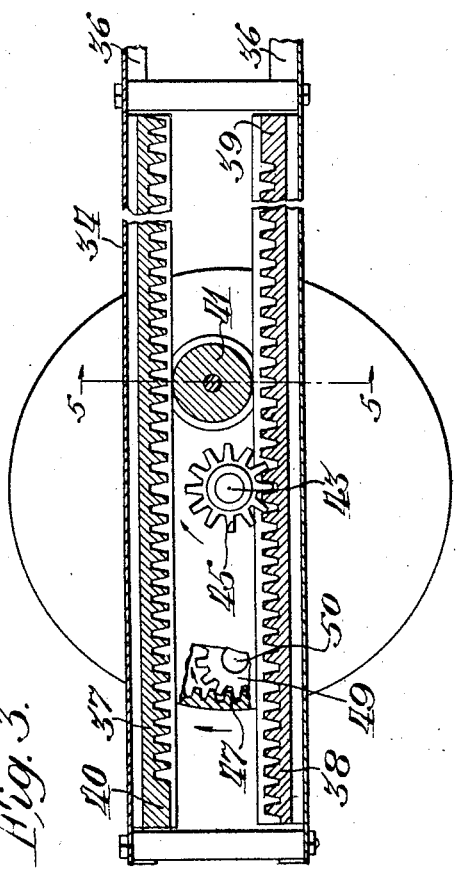
Inventor
Charles Pearson
By W. C. Daniels
Atty.

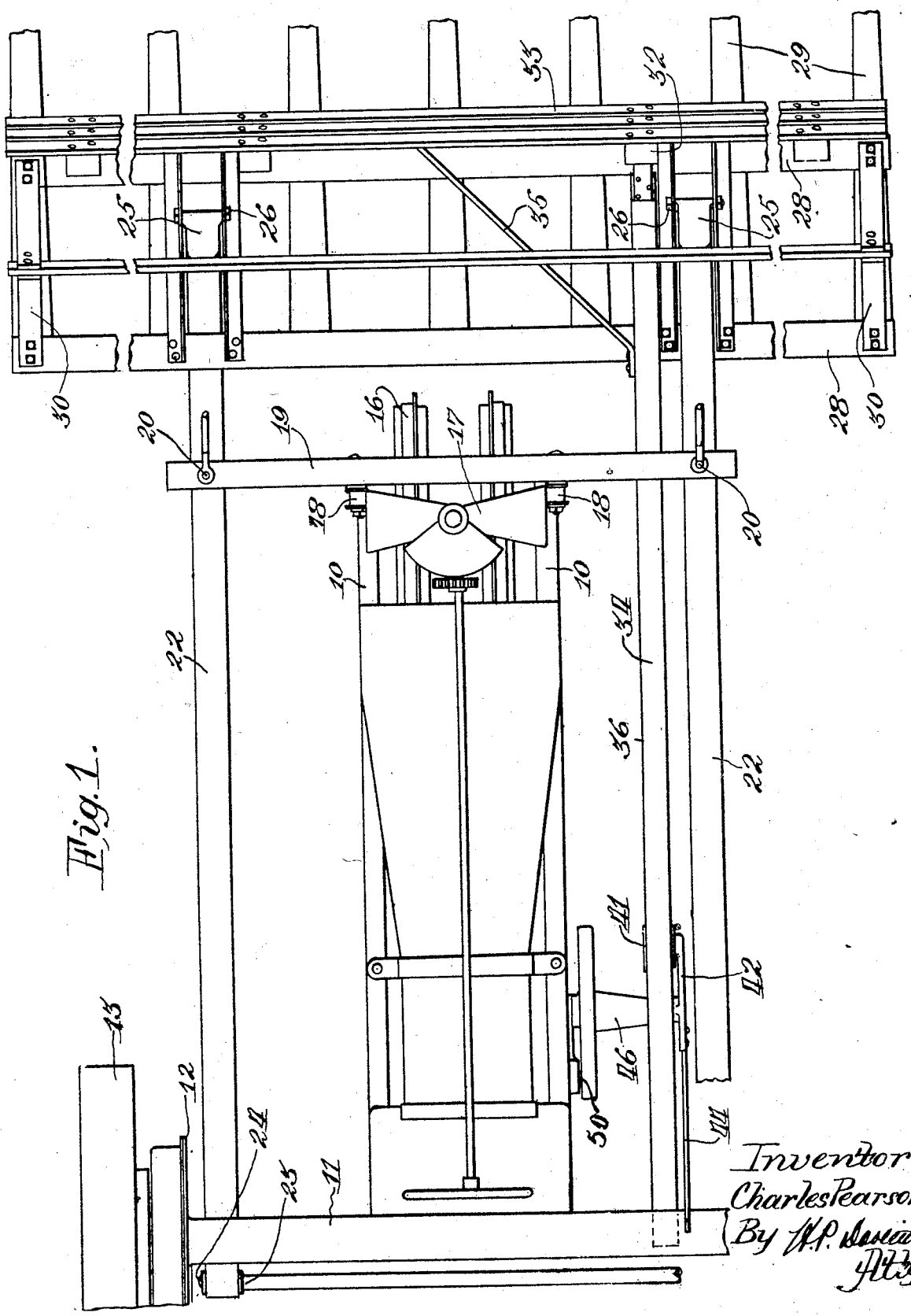

Patented May 17, 1932

1,859,156

UNITED STATES PATENT OFFICE

CHARLES PEARSON, OF CICERO, ILLINOIS, ASSIGNOR TO INTERNATIONAL HARVESTER COMPANY, A CORPORATION OF NEW JERSEY

SWEEP RAKE

Application filed October 20, 1930. Serial No. 489,814.

My invention is in the sweep rake art, and it particularly relates to a power operated load discharging device therefor.

Sweep rakes are now commonly attached to tractors, which take the place of draft animals heretofore used in that connection. When discharging the load from the rake head, it was customary to back the rake and rely upon the stubble in the field to drag the load off the head, or to run the rake head teeth between the teeth of a stacking machine to transfer the load to the stacker. It has been proposed to provide a clearer on the rake head, which was traction operated, to unload the head. It is also known to utilize stakes driven into the ground to hold a clearer device stationary while the head was moved relative thereto to discharge the load.

A sweep rake load of hay discharges readily enough on the ground when backing the rake away from the load, but a load of grain sheaves across the teeth requires a push to stay clear from the teeth when backing the rake away. However, as has been stated, most sweep rakes are used in connection with stackers to which the load has to be transferred by running the sweep rake teeth between the stacker teeth a sufficient distance forwardly to compress the load against the upright teeth on the stacker platform and then backing the rake away. This necessity of forcing the sweep rake forwardly for delivering the load so that at least part of the same will remain on the stacker teeth when backing away frequently causes damage to the stacker timbers which contact the steel points on the sweep rake teeth. In fact this opportunity for damage is greatly accentuated because frequently a second and third push and backing movement is necessary before the load is completely transferred to the stacker teeth without falling off when the stacker is raised. Obviously, then, it can be seen, that any device to assist in delivering the load onto the stacker will save time and expense.

The present invention provides means power driven from the transmission of the tractor, to accomplish the result of moving a clearer on the rake head to discharge the load therefrom. With the prior art devices discussed it was an impossibility to discharge the load when the outfit was standing still, because it was the very essential of traction and stack operated devices that the outfit should be in motion when discharging the load. Obviously, then the transmission power operated arrangement of this invention enables discharge of a load when the rake is standing still.

As has been stated the type of traction discharger now in general use involves a stake or prong designed to enter the ground, said prong having connections with a sliding or swinging backboard, mounted over the teeth of the rake. Such backboard then is held in stationary position at the rear of the load when the prong enters the ground in backing the rake away from the load. This ground connecting type of discharger is not effective enough as it allows the backboard to follow the rake for a distance until the prong gets a firm hold in the ground and, if the rake was not jammed into the stacker far enough the load would drag over the points of the stacker teeth when backing the rake, thereby necessitating a further, or second, push of the rake before the stacker could be raised. In the power operated discharger of this invention the clearer or discharger can be held frictionally against the load at any pressure for a predetermined distance of backing movement of the rake.

Accordingly then, it is the object of this invention to provide an improved tractor operated sweep rake with power actuated means driven from the transmission of the tractor to move a clearer for discharging the load from the rake head in a manner to overcome the objections encountered in the use of present known dischargers.

Other objects will be apparent to those skilled in this art as the disclosure continues.

In the accompanying drawings illustrating a practicable embodiment of my invention,—

Figure 1 is a top plan view of so much of a tractor and sweep rake as are necessary to illustrate the invention;

Figure 2 is a general side elevational view of the tractor and sweep rake mounted thereon with a few of the parts shown in section;

Figure 3 is an enlarged side sectional view through a rack operating mechanism;

Figure 4 is a horizontal sectional view through the gearing from the tractor power take-off shaft that drives the rack mechanism shown in Figure 3; and, Figure 5 is a sectional view taken along the line 5—5 in Figure 3.

The tractor illustrated is of a well known agricultural type embodying a narrow central side frame 10 connected to a transverse rear axle housing 11, which carries depending side gear casings 12, the casings in turn carrying stub axles for mounting the rear traction wheels 13. An operator's seat is carried on the rear axle housing 11 at 14. The side casings 12 also carry a combination cross brace and drawbar structure 15. Said structure is of a conventional construction, as shown in my U. S. Patent No. 1,729,084, being connected to the side casings 12 and held in a substantially horizontal position by supporting rods 15' connected at their upper ends to the gear casings 12. The front end of the tractor is supported on a centrally disposed wheel carriage 16. The frame members 10 across their front ends carry a bolster 17, which bolster is provided with brackets 18 that serve as a support for fixedly carrying a transversely disposed angle bar support 19, connected to the brackets 18 by securing members 19', which support at its ends is provided with depending hangers 20 connected in eyes 21 carried in frame members 22 for the sweep rake structure now to be described. The depending hangers 20 are adjustably secured to the support 19 by threaded members 20'. Said members are provided with cranks for manual adjustment. As the mounting of the rake does not form a part of the present invention, only such details are shown and described as are necessary to clearly disclose an operative embodiment of the invention.

These frame members 22, it will be noticed, are longitudinally disposed, one on each side of the tractor body 10, said members 22 at their rear ends being pivotally connected at 23 to any appropriate brackets 24 carried on the element 15. The forward ends of these members 22 are provided with goose necks 25 pivoted at 26 to angle bars 27 carried by a pair of transversely disposed, spaced rake head beams 28. To the under side of these beams 28 are secured in any conventional manner the rake teeth or tines 29. Each end of the rake head carries an A support 30, which has connected thereto the usual push and pull link 31 for rocking the rake head about its pivot 26 to raise and lower the teeth 29.

The head also carries a backboard and clearer element 32 provided with cross boards 33 in the usual manner, the lower one of which rests on the rake teeth 29 for sliding movement there-across. Connected to the backboard element 32 is a push and pull beam 34 braced at 35 to strengthen this connection of the parts. As best shown in Figures 2 and 3, the rear end of this beam 34 consists of upper and lower channel bars 36, said bars carrying upper and lower racks 37 and 38, respectively,—the lower rack 38 having a land 39 at its front end, and the upper rack a land 40 at its rear end. Carried between the members 36 is a roller 41, which roller is carried on an arm 42 pivoted on a shaft 43, there being a lever 44 appropriately associated with the arm 42 and fulcrumed on this shaft 43, the lever 44 being accessible to the operator's seat 14 on the tractor. The shaft 43 carries a pinion 45 rotatable with a sleeve 46 on the shaft, said sleeve 46 in effect forming a hub having a face frictionally connected to the face of an internal ring gear 47 by the flexible connections 48. Because of this frictional engagement between the faces on parts 46 and 47 the clearer can be held frictionally against the load at any pressure to compress the load against a stacker head for a predetermined distance when backing the rake. Thus a differential action results tending to force back the rake. The ring gear in turn is driven from a pinion 49 on the shaft 50 protruding from the body of the tractor, said shaft 50 in practice being the usual pulley power take-off. A spring 51 will be so connected to the lever and supported on the rear axle 11 of the tractor as to hold the lever with its gear 45 in a neutral position midway between the two racks 37, 38, with the result that the clearer 32 will normally be maintained in an inoperative position at the rear end of the rake head to serve as a backboard.

In operation, a load of hay will be gathered in a conventional manner on the teeth 29. The teeth 29 will then be raised, as shown in Figure 2, in the usual way for transporting the load to a point of discharge. At such point the teeth 29 will be lowered to ground engaging position. The shaft 50 of the tractor is running clockwise continuously, as viewed in Figure 3, and, as a result, the gears 49 and 47, and gear 45 will be operating continuously, but, due to the action of the spring 51, the lever 44 is held in a position so that the gear 45 will be kept in a neutral position midway between the two racks 37 and 38, so that normally the racks are not driven. The load on the teeth 29 in this point of the description of the operation is now ready for discharge. The tractor can be either moving or standing still, the noteworthy thing being that the gear 45 is always operating in a clockwise direction. Obviously to discharge the load, the backboard 32 must be moved ahead across the teeth 29 and, therefore, the lever 44 will be moved upwardly by the operator, so that the wheel 41 will push down on the racks to engage the upper rack 37 with the top side of the gear 45. Thus, the beam 34 will be driven forwardly so that the backboard or follower 32 will remove the load from the teeth 29 and dump the same. At the maximum front point of movement, the gear 45 rides onto the land 40 of the upper rack automatically to stop the drive of the rack. With the load thus discharged, the lever 44 will be swung downwardly, which will raise the rack 37 off the gear 45 and engage the rack 38 with the lower face of the gear 45 and, as a result, the rack will be driven to the rear, causing the beam 34 to pull the clearer 32 back again to its normal position, as shown in Figure 2. The limit of movement is reached when the gear 45 rides onto land 39 at the front end of the lower rack thereby stopping the drive automatically.

The obvious advantages for this construction are that the tractor provides a continuous source of power whether the tractor be standing or moving, which can easily be taken off to move the clearer 32 forwardly or to the rear, without any effort on the part of the operator other than moving the lever 44, which requires little energy. The construction is simple and effective and not likely to get out of order.

It is the intention to cover all such changes as do not depart from the spirit and scope of the invention as expressed in the following claims.

What is claimed is:

1. The combination with a tractor having a power take-off shaft, of a sweep rake having a frame carried by the tractor, a clearer slidably carried on the rake, means operable from the power take-off shaft for sliding the clearer on the rake to clear the same, and means automatically operable to disengage said means after the clearer has been moved a predetermined distance.

2. The combination with a tractor having a power take-off shaft, of a sweep rake having a frame carried by the tractor, a clearer slidably carried on the rake for reciprocating movement with respect thereto, and means including reverse gearing connecting the clearer to the power take-off shaft for sliding the clearer on the rake in reverse directions.

3. The combination with a tractor having a power take-off shaft, of a sweep rake having a frame carried by the tractor, a clearer carried on the rake and mounted for reciprocation with respect thereto, and means operable from the power take-off shaft for moving the clearer on the rake in opposite directions.

4. The combination with a tractor having a power take-off shaft, of a sweep rake having a frame connected to the tractor, a backboard slidably carried on the rake, means manually connectible with said power take-off shaft for sliding the backboard on the rake to clear the same, and means operable to automatically disengage said means when the backboard has moved a predetermined distance.

5. The combination with a tractor having a power take-off shaft, of a sweep rake having a frame connected to the tractor, a backboard slidably carried on the rake, normally inoperative means connecting the power take-off shaft and the backboard, manually engageable means for operating said means to move the backboard on the rake, and means automatically operable to disengage said means when the backboard has moved a predetermined distance.

6. The combination with a tractor having a power take-off shaft, of a sweep rake connected to the tractor, said rake including a clearer carried for sliding movement on the rake, a beam connected to the clearer, and gearing connecting the beam to the power take-off shaft for operating the clearer.

7. The combination with a tractor having a power take-off shaft, of a sweep rake connected to the tractor, said rake including a clearer carried for reciprocating sliding movement on the rake, a beam connected to the clearer, and reversible gearing connecting the beam to the power take-off shaft for operating the clearer in reverse directions.

8. The combination with a tractor having a power take-off shaft, a gear continuously driven from said shaft, of a sweep rake connected to the tractor, said rake including a clearer carried for sliding movement on the rake, a beam connected to the clearer, and a rack connecting the beam to the gear driven by the power take-off shaft for operating the clearer.

9. The combination with a tractor having a power take-off shaft, a gear continuously driven from said shaft, of a sweep rake connected to the tractor, said rake including a clearer carried for sliding movement on the rake, a beam connected to the clearer, a rack carried by the beam, and means to mesh the rack with the gear for operating the clearer.

10. The combination with a tractor having a power take-off shaft, of a sweep rake connected to the tractor, said rake including a clearer carried for sliding movement on the rake, means connecting the clearer to the power take-off shaft for operating the clearer, and means automatically operable to disengage said clearer operating means for limiting the movement of the clearer.

11. The combination with a tractor having a power take-off shaft, of a sweep rake connected to the tractor, said rake including a clearer carried for sliding movement on the rake, a beam connected to the clearer, a pair of racks mounted on the beam, a gear between the racks normally held out of engagement with the said racks, said gear being constantly rotated by said power take-off shaft, and means for optionally engaging either rack with the gear to move the beam whereby to slide the clearer fore and aft as desired.

12. The combination with a tractor having a power take-off shaft, of a sweep rake connected to the tractor, said rake including a clearer carried for sliding movement on the rake, a beam connected to the clearer, a pair of racks mounted on the beam, a gear between the racks normally held out of engagement with the said racks, said gear being constantly rotated by said power take-off shaft, means for optionally engaging either rack with the gear to move the beam whereby to slide the clearer fore and aft as desired, and automatically acting means for disengaging the racks from the gear to limit the movement of the clearer.

13. The combination with a tractor having a power take-off shaft, of a sweep rake connected to the tractor, said rake including a clearer carried for sliding movement on the rake, a beam connected to the clearer, a rack mounted on the beam, a gear normally held out of engagement with the said rack, said gear being constantly rotated by said power take-off shaft, and means for engaging the rack with the gear to move the beam whereby to slide the clearer.

14. The combination with a tractor having a power take-off shaft, of a sweep rake connected to the tractor, said rake including a clearer carried for sliding movement on the rake, a beam connected to the clearer, a rack mounted on the beam, a gear normally held out of engagement with the said rack, said gear being constantly rotated by said power take-off shaft, and operator controlled lever means for engaging the rack and gear to move the beam whereby to slide the clearer.

15. The combination with a sweep rake, of a discharger movably carried thereon, power means for operating the discharger, and means for frictionally holding the discharger to compress the load when transferring the same to a stacker during backing movement of the rake, said frictional means being automatically disengaged after a predetermined distance of backing movement of the rake.

16. The combination with a tractor having a power take-off shaft, of a sweep rake connected to the tractor, a discharger movably carried by the rake, means for operating the discharger from the take-off shaft, and means for holding the discharger in position on the rake to compress the load when transferring the same to a stacker during backing movement of the rake, said means being automatically disengaged after a predetermined distance of backing movement of the rake.

In testimony whereof I affix my signature.

CHARLES PEARSON.